United States Patent
Khan et al.

(10) Patent No.: US 10,043,318 B2
(45) Date of Patent: Aug. 7, 2018

(54) DISPLAY SYNCHRONIZED IMAGE WARPING

(71) Applicant: QUALCOMM Incorporated, San Diego, CA (US)

(72) Inventors: Moinul Khan, San Diego, CA (US); Nhon Quach, San Jose, CA (US); Martin Renschler, San Diego, CA (US); Ramesh Chandrasekhar, Oceanside, CA (US); Assaf Menachem, Yokneam Illit (IL); Ning Bi, San Diego, CA (US); Maurice Ribble, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/374,165

(22) Filed: Dec. 9, 2016

(65) Prior Publication Data

US 2018/0165878 A1 Jun. 14, 2018

(51) Int. Cl.
| | |
|---|---|
| G09G 5/10 | (2006.01) |
| G06T 19/00 | (2011.01) |
| G06T 7/20 | (2017.01) |
| G06F 3/01 | (2006.01) |
| G06T 3/00 | (2006.01) |
| G06T 5/00 | (2006.01) |

(Continued)

(52) U.S. Cl.
CPC .......... *G06T 19/006* (2013.01); *G06F 3/012* (2013.01); *G06T 1/60* (2013.01); *G06T 3/0093* (2013.01); *G06T 5/00* (2013.01); *G06T 7/20* (2013.01); *G06T 11/60* (2013.01)

(58) Field of Classification Search
CPC .................................................... G06T 3/0093
See application file for complete search history.

(56) References Cited

U.S. PATENT DOCUMENTS

| | | | |
|---|---|---|---|
| 6,445,815 B1 * | 9/2002 | Sato | H04N 13/0221 |
| | | | 348/E13.008 |
| 9,232,139 B2 * | 1/2016 | Mills | H04N 5/77 |
| 9,240,069 B1 * | 1/2016 | Li | G06T 15/00 |

(Continued)

OTHER PUBLICATIONS

International Search Report and Written Opinion—PCT/US2017/065077—ISA/EPO—dated Mar. 29, 2018.

(Continued)

*Primary Examiner* — Robert Craddock

(74) *Attorney, Agent, or Firm* — Patterson & Sheridan, LLP

(57) ABSTRACT

Certain aspects of the present disclosure provide methods and apparatus for operating a wearable display device. Certain aspects of the present disclosure provide a method for operating a wearable display device. The method includes determining a position of the wearable display device based on a motion sensor. The method includes rendering, by a graphics processing unit, an image based on the determined position. The method includes determining a first updated position of the wearable display device based on the motion sensor. The method includes warping, by a warp engine, a first portion of the rendered image based on the first updated position. The method includes displaying the warped first portion of the rendered image on a display of the wearable display device.

30 Claims, 8 Drawing Sheets

(51) Int. Cl.
*G06T 11/60* (2006.01)
*G06T 1/60* (2006.01)

(56) References Cited

U.S. PATENT DOCUMENTS

| | | |
|---|---|---|
| 9,338,439 B2 | 5/2016 | Grossmann et al. |
| 2011/0085049 A1* | 4/2011 | Dolgin ............... H04N 5/23248 348/208.4 |
| 2014/0071116 A1 | 3/2014 | Johansson et al. |
| 2014/0078023 A1* | 3/2014 | Ikeda ................. G02B 27/0025 345/8 |
| 2016/0247255 A1* | 8/2016 | Staudenmaier .... G02B 27/0025 |
| 2016/0260246 A1 | 9/2016 | Oldcorn et al. |
| 2016/0307297 A1 | 10/2016 | Akenine-Moller et al. |

OTHER PUBLICATIONS

Waveren Van J.M.P., "The Asynchronous Time Warp for Virtual Reality on Consumer Hardware", CM Conference on Virtual Reality Software and Technology, Nov. 2016, pp. 37-46.

* cited by examiner

DISPLAY SYNCHRONIZED IMAGE WARPING

TECHNICAL FIELD

Certain aspects of the present disclosure generally relate to image processing and, more particularly, to techniques for display synchronized image warping.

BACKGROUND

The use of wearable display devices, such as for use in virtual reality (VR) systems, is becoming more prevalent. For example, users may use the wearable display devices to visually immerse themselves in a VR or augmented reality (AR) environment. A wearable display device may comprise any type of wired or wireless display device that is worn on a user's body. As an example, the wearable display device may comprise a wired or wireless head-worn display or wired or wireless head-mounted display (HMD) that is worn on a user's head in order to position one or more displays (opaque, transparent, semi-transparent, etc.) in front of the user's eyes.

One or more processors (e.g., graphics processing unit (GPU), central processing unit (CPU), etc.) may be configured to process and render the multimedia data (e.g., images, scenes, videos, etc.) displayed on the wearable display device. Such processors may be integrated in the wearable display device, or may be coupled to the wearable display device (e.g., using wireless or wired connection).

Further, the wearable display device may include one or more sensors (e.g., accelerometer(s), magnetometer(s), gyroscopes, Global Positioning System (GPS) receiver(s) (and/or other Satellite Positioning System (SPS) receiver(s)), altimeter(s), etc.) to sense movement and/or orientation of the wearable display device. The movement and/or orientation of the wearable display device may correspond to movement and/or orientation of a user (e.g., user's head) wearing the wearable display device. The movement and/or orientation information may be used to determine the image to display on the wearable display device. For example, a user wearing the wearable display device may be viewing a scene (e.g., from a first-person perspective). The image of the scene displayed to the user may be based on movement and/or orientation of the wearable display device so that the view of the scene corresponds to the position of the wearable display device, thereby immersing the user in the scene.

SUMMARY

Certain aspects of the present disclosure provide a method for operating a wearable display device. The method includes determining a position of the wearable display device based on a motion sensor. The method includes rendering an image based on the determined position. The method includes determining a first updated position of the wearable display device based on the motion sensor. The method includes warping a first portion of the rendered image based on the first updated position and to correct for distortion due to a lens of the wearable display device. The method includes displaying the warped first portion of the rendered image on a display of the wearable display device. The method includes determining a second updated position of the wearable display device based on the motion sensor. The method includes warping a second portion of the rendered image based on the second updated position and to correct for distortion due to the lens of the wearable display device. The method includes displaying the warped second portion of the rendered image on the display of the wearable display device.

Certain aspects of the present disclosure provide a method for operating a wearable display device. The method includes determining a position of the wearable display device based on a motion sensor. The method includes rendering, by a graphics processing unit, an image based on the determined position. The method includes determining a first updated position of the wearable display device based on the motion sensor. The method includes warping, by a warp engine, a first portion of the rendered image based on the first updated position. The method includes displaying the warped first portion of the rendered image on a display of the wearable display device.

Certain aspects of the present disclosure provide a computer system for operating a wearable display device. The computer system includes a processor configured to determine a position of the wearable display device based on a motion sensor. The processor is further configured to determine a first updated position of the wearable display device based on the motion sensor. The processor is further configured to determine a second updated position of the wearable display device based on the motion sensor. The computer system includes a graphics processing unit configured to render an image based on the determined position. The computer system includes a warp engine, separate from the graphics processing unit, configured to warp a first portion of the rendered image based on the first updated position and to correct for distortion due to a lens of the wearable display device. The warp engine is further configured to warp a second portion of the rendered image based on the second updated position and to correct for distortion due to the lens of the wearable display device. The computer system includes a display driver configured to display the warped first portion of the rendered image on a display of the wearable display device. The display driver is further configured to display the warped second portion of the rendered image on the display of the wearable display device.

Certain aspects of the present disclosure provide a computer system for operating a wearable display device. The computer system includes means for determining a position of the wearable display device based on a motion sensor. The computer system includes means for rendering an image based on the determined position. The computer system includes means for determining a first updated position of the wearable display device based on the motion sensor. The computer system includes means for warping a first portion of the rendered image based on the first updated position and to correct for distortion due to a lens of the wearable display device. The computer system includes means for displaying the warped first portion of the rendered image on a display of the wearable display device. The computer system includes means for determining a second updated position of the wearable display device based on the motion sensor. The computer system includes means for warping a second portion of the rendered image based on the second updated position and to correct for distortion due to the lens of the wearable display device. The computer system includes means for displaying the warped second portion of the rendered image on the display of the wearable display device.

Certain aspects of the present disclosure provide a non-transitory, computer readable medium having instructions stored thereon for operating a wearable display device. Execution of the instructions by a computing system causes the computing system to carry out the step of determining a position of the wearable display device based on a motion sensor. Execution of the instructions by the computing system causes the computing system to carry out the step of rendering an image based on the determined position. Execution of the instructions by the computing system causes the computing system to carry out the step of determining a first updated position of the wearable display device based on the motion sensor. Execution of the instructions by the computing system causes the computing system to carry out the step of warping a first portion of the rendered image based on the first updated position and to correct for distortion due to a lens of the wearable display device. Execution of the instructions by the computing system causes the computing system to carry out the step of displaying the warped first portion of the rendered image on a display of the wearable display device. Execution of the instructions by the computing system causes the computing system to carry out the step of determining a second updated position of the wearable display device based on the motion sensor. Execution of the instructions by the computing system causes the computing system to carry out the step of warping a second portion of the rendered image based on the second updated position and to correct for distortion due to the lens of the wearable display device. Execution of the instructions by the computing system causes the computing system to carry out the step of displaying the warped second portion of the rendered image on the display of the wearable display device.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Figure 1:
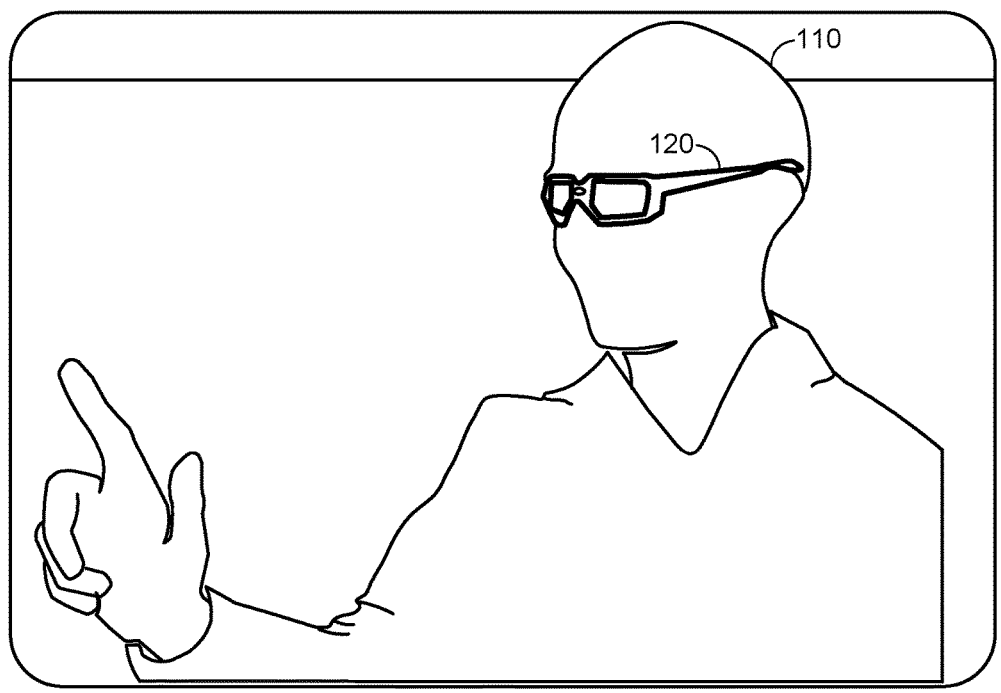
FIG. 1 is a simplified illustration of an example of a wearable display device worn on a head of a user, according to certain aspects of the present disclosure.

FIG. 1 is a simplified illustration of an example of a wearable display device 120 worn on a head of a user 110 that can be used with or can implement one or more of the aspects described herein. The wearable display device 120 includes a body or frame, similar to a pair of glasses, which can rest on the nose and ears of a user. Portions of the display of the wearable display device 120 can be positioned in front of a user's eyes like lenses of a pair of glasses. In some aspects, the display is opaque (e.g., for VR). In some aspects, at least a portion of the display can be transparent (e.g., for AR), such that within the user's field of view the user 110 can see both the user's surroundings and images (e.g., data elements) shown with the display. The level of transparency of the images shown on the display may vary, depending on the desired functionality of the display, settings of a graphical user interface (GUI) shown with the display, and/or a software application executed by the wearable display device 120 (e.g., a video, a map, an Internet browser, etc.).

Furthermore, the wearable display device 120 may include interfaces such as speakers (and/or headphones), a touchpad, buttons, and the like to interact with the user 110. In another aspect, the wearable display device 120 may include a wireless interface for connecting with the Internet, a local wireless network, or another computing device. The wearable display device 120 may also be operable to receive audio and/or gestural inputs from a user. Such gestural or audio inputs may be spoken voice commands or a recognized user gesture, which when recognized by a computing device may cause that device to execute a corresponding command. Gestures may be received from one or more motion sensors and/or cameras integrated into and/or communicatively coupled with the wearable display device 120 to allow the wearable display device to track one or more objects, such as a user's hand(s), and determine whether the object(s) has made a gesture. Furthermore, in certain aspects the wearable display device 120 may include camera(s) and/or other sensors to determine the gaze of a user (e.g., where a user is looking). This eye-tracking functionality can be incorporated into gestures and/or other user inputs, or be used for image warping, including foveated rendering, as discussed herein.

Furthermore, the wearable display device 120 can include and/or be communicatively coupled with motion sensors, such as one or more accelerometer(s), magnetometer(s), gyroscopes, Global Positioning System (GPS) receiver(s) (and/or other Satellite Positioning System (SPS) receiver(s)), altimeter(s), cameras, infrared sensors, etc., to sense the position (e.g., movement and/or orientation) of the user 110 and/or the user's head. A determination of the user's field of view, for purposes of displaying images as described herein, can be based on sensor information providing, for example, a detected head orientation/direction of travel of the user. A direction of travel can be determined by, for example, a compass (e.g., a magnetometer) and/or a plurality of positioning measurements (e.g., SPS location measurements). Elevation and/or context data may be used to determine whether a user is looking down or up because a pathway is slanted. For instance, data from the gyroscope may be compared to elevation data to determine whether the head is tilted in a direction in which a path on which the user is located is tilted.

Figure 2:
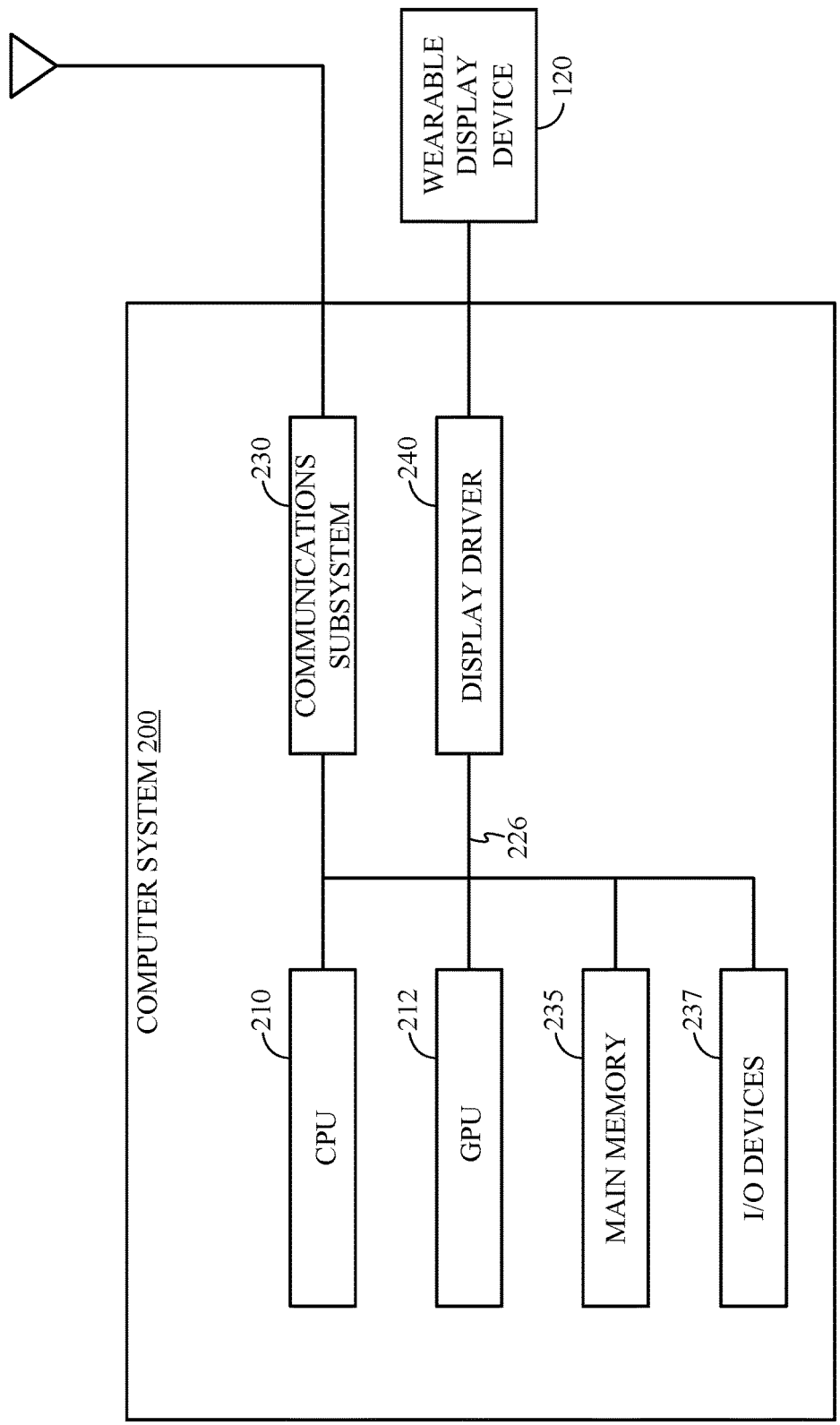
FIG. 2 illustrates an embodiment of a computer system, which may be incorporated into and/or communicatively coupled with the wearable display device of FIG. 1, according to certain aspects of the present disclosure.

A computer system, such as computer system 200 of FIG. 2 may be integrated into and/or communicatively coupled (wired or wirelessly) with the wearable display device 120. Accordingly, the wearable display device 120 can execute software applications such as games, maps, videos, and/or other applications described herein that generate images that are displayed on the wearable display device 120. Additionally or alternatively, in certain aspects the wearable display device 120 can display software applications executed by one or more devices communicatively coupled with the wearable display device 120 via, for example, wireless device-to-device protocol (e.g., BLUETOOTH or WI-FI DIRECT) and/or via a network (e.g., a WIFI network). For instance, the wearable display device 120 may be communicatively coupled with one or more mobile devices such as a mobile phone, personal media player, game system, and/or other device, and display information from the mobile device.

One or more components of the computer system 200 could be shared between different devices, such as a wearable display device, smart phone, tablet, personal computer, or other computing device. In some embodiments, software and other applications could be run on a separate device communicatively linked to the wearable display device. In other embodiments, a wearable display device may have some or all of the computer system 200 integrated therewith.

FIG. 2 provides a schematic illustration of one embodiment of a computer system 200 that can perform the methods provided by various other embodiments. It should be noted that FIG. 2 is meant only to provide a generalized illustration of various components, any or all of which may be utilized as appropriate. FIG. 2, therefore, broadly illustrates how individual system elements may be implemented in a relatively separated or relatively more integrated manner.

The computer system 200 is shown comprising hardware elements that can be electrically coupled via a bus 226 (or may otherwise be in communication, as appropriate). The hardware elements may include a CPU 210, which can include without limitation one or more general-purpose processors, one or more special-purpose processors, and/or other processing means, which, as stated above, can be utilized to perform various steps, such as one or more of the blocks shown in FIG. 3. The bus 226 may couple two or more of the CPUs 210, or multiple cores of a single CPU or a plurality of CPUs. Hardware elements may also include one or more input/output devices 237, which can include without limitation one or more GPS receivers (and or receivers from any other Satellite Positioning System (SPS)), accelerometers, gyroscopes, magnetometers (and/or other orientation sensors), altimeters, cameras, and/or other sensors to be able to detect location, motion, orientation, light, sound, and the like, which can be utilized as means for gathering position, movement, and other data. Moreover, sensors may be utilized, together with the CPU 210, as means for detecting the movement of a wearable display device 120 on a user's head, as described herein. Other devices such as a touch pad, keyboard, microphone, and/or the like may also be included. One or more additional devices are also included. These devices can include one or more displays and/or other display means, as well as speakers and/or other devices.

The computer system 200 may further include a main memory 235, which can comprise, without limitation, a random access memory ("RAM"), such as a dynamic random-access memory (DRAM), such as, double data rate (DDR) synchronous DRAM (SDRAM).

The computer system 200 further includes a GPU 212 which is a special purpose processor for handling graphics processing. The computer system 200 further includes a display driver 240 configured to drive a display on the wearable display device 120, such as by driving the scanning of portions of the display to display images.

The computer system 200 might also include a communications subsystem 230, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 230 may include one or more input and/or output communication interfaces to permit data to be exchanged with a network, other computer systems, and/or any other electrical devices/peripherals.

The computer system 200 also can comprise software elements, such as located within the main memory 235, including an operating system, device drivers, executable libraries, and/or other code, such as one or more application(s), which may comprise computer programs provided by various embodiments, and/or may be designed to implement methods, and/or configure systems, provided by other embodiments, as described herein. Merely by way of example, a portion of one or more procedures described with respect to the method(s) discussed herein, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium. In some cases, the storage medium might be incorporated within a computer system, such as computer system 200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 200 and/or might take the form of source and/or installable code, which, upon compilation and/or installation on the computer system 200 (e.g., using any of a variety of generally available compilers, installation programs, compression/decompression utilities, etc.), then takes the form of executable code.

It will be apparent to those skilled in the art that substantial variations may be made in accordance with specific requirements.

Although FIG. 1 shows an embodiment of a wearable display device 120 with a glasses-like frame and a screen (e.g., liquid crystal display (LCD), organic light-emitting diode (OLED), etc.) for a display, other embodiments can have different form factors and/or utilize different optical technologies (e.g., a retinal projector or other optical system) that can offer similar display functionality. When discussing displaying images on the wearable display device 120, such displaying refers to displaying the images on the display of the wearable display device 120.

For such wearable display devices 120, one performance metric is the motion to photon (M2P) delay, which measures the time delay from movement of the wearable display device 120 to the time when the image displayed on the wearable display device 120 is updated to correspond to the movement (e.g., new position) of the wearable display device 120. For example, the user 110 may be looking in one direction and the wearable display device 120 may display a first scene. The user 110 may then move his head and a scene corresponding to the new position of the user 110 needs to be displayed. Having a low latency (e.g., <20 ms) between the change in position of the user 110 and update of the display on the wearable display device 120 advantageously allows for a more realistic experience, and also prevents the user from having motion sickness.

Another concern with such wearable display devices 120 is accommodating for the memory bandwidth demand for reading and writing images to memory. For example, memory bandwidth demand may be extremely high for high resolutions (e.g., 4K and above per eye). The impact of the process for rendering an image on the screen of the wearable display device 120 on M2P delay and memory bandwidth is further discussed with respect to FIG. 3.

Figure 3:
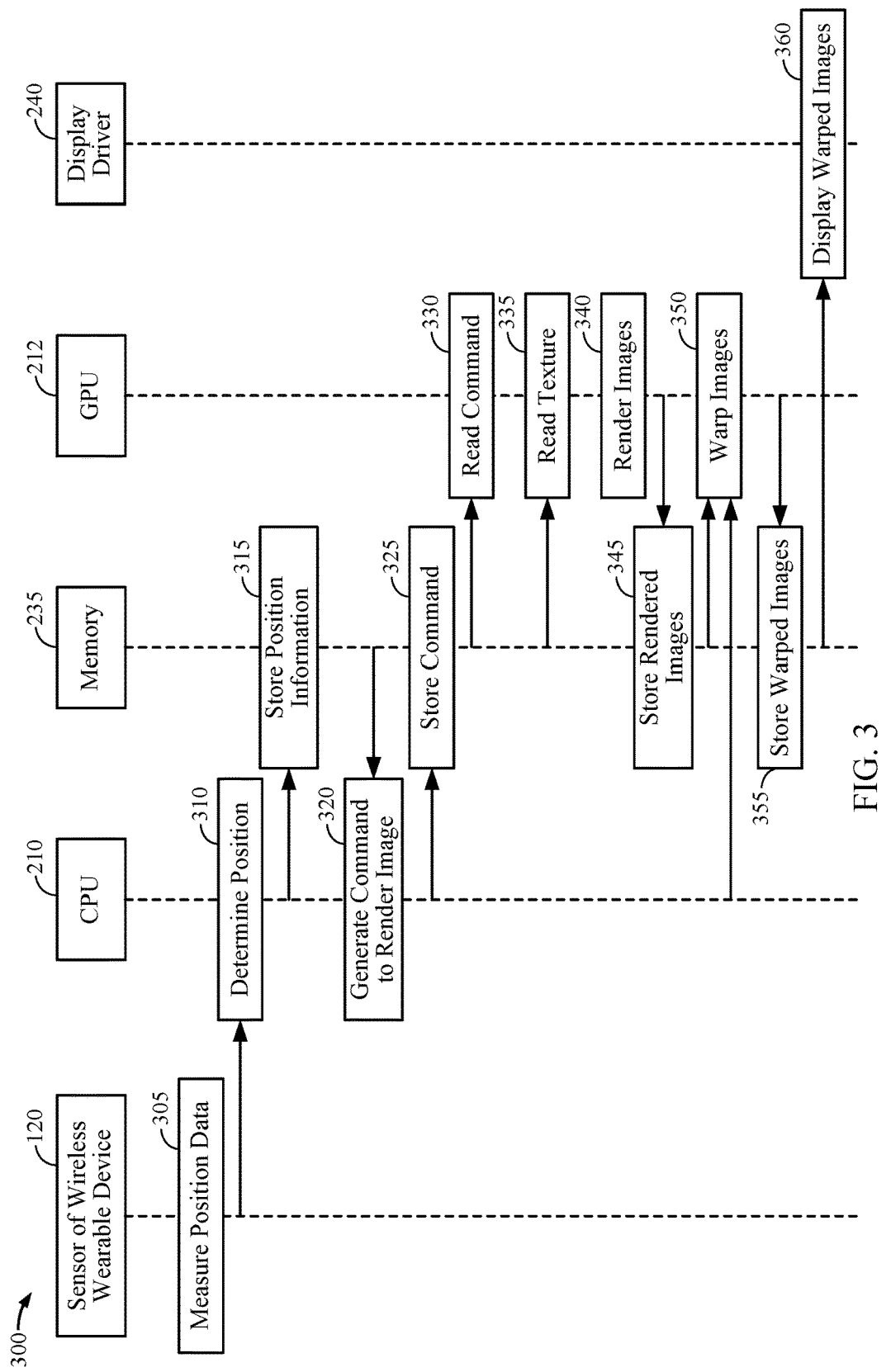
FIG. 3 illustrates an example data flow for rendering an image on the display of the wearable display device of FIG. 1 using the computer system of FIG. 2, according to certain aspects of the present disclosure.

FIG. 3 illustrates an example data flow 300 for rendering an image on the display of the wearable display device 120 using the computer system 200. As shown, at 305, motion sensors may be used to measure data related to a position of the wearable display device 120. At 310, the measured motion sensor data is received and processed by CPU 210 to determine a position (e.g., three degrees of freedom (3DoF) pose data, 6DoF pose data, etc.) of the wearable display device 120. At 315, the position information may be stored in main memory 235. At 320, the CPU 210 reads the position information from main memory 235 and generates an application command to render an image based on the position information. For example, the CPU 210 generates a command for the GPU 212 to render a scene, such as for an executing application. At 325, the application command is stored in main memory 235. At 330, the GPU 212 reads the application command from main memory 235 and, at 335, reads a texture (e.g., image) corresponding to the application command (i.e., a texture based on the position information stored at 315) from main memory 235. At 340, the GPU 212 renders, based on the texture, an image for a right eye and an image for a left eye of the user 110 to be displayed on a display of the wearable display device 120. The rendered images correspond to the position information stored at 315. At 345, the GPU 212 stores the rendered images for each eye in the main memory 235. At 350, the GPU 212 reads the rendered images from the main memory 235 and warps the rendered images, such as by applying time warping, lens warping, etc., to the rendered images as further discussed herein. At 355, the GPU 212 stores the warped images in the main memory 235. At 360, display driver 240 reads the entire warped images from main memory 235 and drives the display of the wearable display device 120 with the warped images.

Time warping an image, such as performed at 350, refers to changing the rendered image to be displayed in the wearable display device 120 due to a changed position of the wearable display device 120 after the image has already been rendered, such as by the GPU 212. For example, as discussed with respect to data flow 300, the GPU 212 may render images based on a position of the wearable display device 120. Such position information, however, is determined at some time interval before the GPU 212 actually renders the image (e.g., due to latency in CPU, GPU, etc. processing and memory reads and writes). Accordingly, the position of the wearable display device 120 may further change between when the position is initially determined (e.g., at 310), when the image is rendered (e.g., at 340), and further when the rendered image is displayed on the display of the wearable display device 120 (e.g., at 360). Therefore, after the image is rendered and before it is displayed on the wearable display device 120, time warping may be applied to the rendered image, which modifies the rendered image based on updated position information for the wearable display device 120. For example, at 350, the GPU 212 receives updated position information from CPU 210 and applies transforms (e.g., using depth maps (Z buffers) to move objects in the image to give parallax based on the updated position) to the rendered image, which may have reduced computational complexity as compared to re-rendering the image.

Lens warping an image, such as performed at 350, refers to changing the rendered image to be displayed in the wearable display device 120 to correct for the distortion introduced by lenses in the wearable display device 120. For example, the wearable display device 120 may utilize lenses in addition to displays for directing the image into the eyes of a user. The image displayed on the display may need to be transformed (e.g., barrel distorted, color aberration corrected, etc.) to correct for the distortion introduced by the lenses.

Since the GPU 212 needs to both render the image and further warp the image, extra processing cycles are used for performing the warping and there is a penalty from the context switch between rendering and warping, meaning there are fewer resources available for rendering.

Further, since the warping is applied as a separate step in the overall processing chain, the peak bandwidth to main memory 235 is increased as the rendered images and warped images are read from the main memory 235 (e.g., at 350 and 360) and written to the main memory 235 (e.g., at 345 and 355). Further, to ensure that the warping is completed on time for both storing and reading from main memory 235 in order to display the image on the display of the wearable display device 120 at the next refresh of the display, the warping process may be initiated early, thereby introducing additional delay in the M2P.

Accordingly, techniques herein relate to systems and methods for applying warping, such as time warping and lens warping, to images rendered by a GPU for display on a wearable display device that reduce the delay in M2P and bandwidth to memory. In particular, certain aspects herein relate to a warp engine that is separate from the GPU used to render images.

Figure 4:
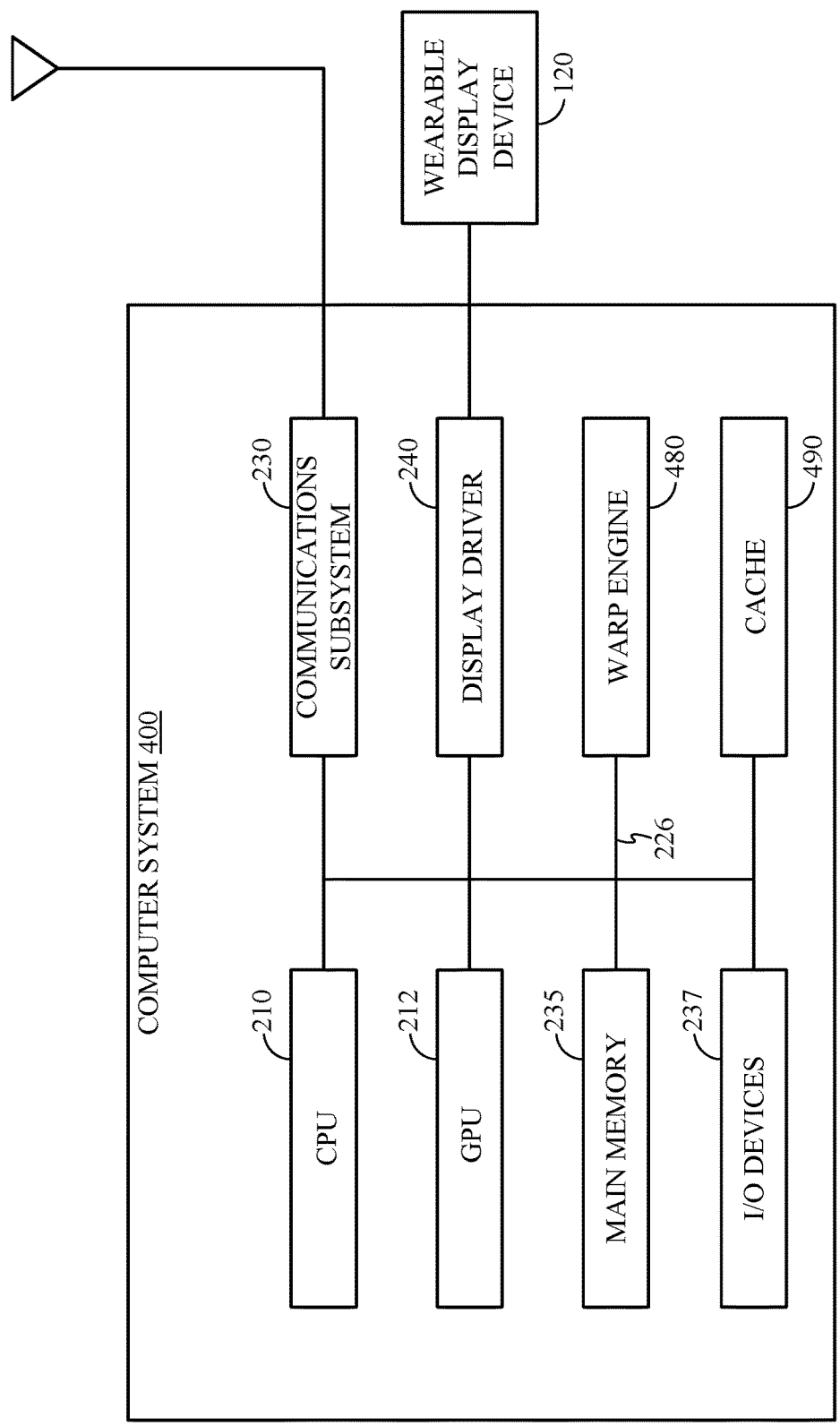
FIG. 4 illustrates an embodiment of a computer system, which may be incorporated into and/or communicatively coupled with the wearable display device of FIG. 1, according to certain aspects of the present disclosure.

FIG. 4 is a block diagram of an example computer system 400 including an image rendering system with a warp engine separate from a GPU, according to certain aspects of the present disclosure. As shown, the computer system 400 includes the same components as the computer system 200 of FIG. 2, but additionally includes a warp engine 480 and a cache 490. As shown, the warp engine 480 is coupled to the main memory 435 and the cache 490. The warp engine 480 may be a processing unit, such as an integrated circuit configured to perform certain operations described herein. In certain aspects, the warp engine 480 is a separate hardware component (e.g., hardware accelerator) than the GPU and/or other components of the computer system 400. The cache 490 may be a small amount of volatile memory. In certain aspects, the cache 490 is on-chip memory (e.g., system cache) that is separate from the main memory 435 (e.g., off-chip memory). For example, the cache 490 may be on a same die or a packaged chip with the CPU 210 and/or the GPU 212.

The warp engine 480 may be configured to warp images (e.g., time warp, lens warp, etc.) rendered by the GPU 212. By separating the resources, e.g., GPU 212, used for rendering the image from resources used to warp the images, e.g., the warp engine 480, more resources can be used to render images, thereby reducing latency for rendering the images, and M2P delay.

Further, in some aspects, the warp engine 480 may, asynchronously with respect to the rendering by the GPU 212, warp portions of the images rendered by the GPU 212. For example, the warp engine 480 may be synchronized with the display (e.g., refresh rate, scanning time, etc.) of the wearable display device instead of the GPU 212 and warp portions of the rendered images (e.g., stripe by stripe, line by line, etc.) "just in time" as the display of the wearable display device 120 actually scans and displays those portions of the image on the display. The "just in time" warping may reduce M2P delay as there is little delay between the warping and display on the display.

For example, in some aspects, the warp engine 480 may read the rendered image data produced by the GPU 212 from the main memory 235. However, instead of writing the entire warped image back to the main memory 235, the warp engine 480 may write only the portion of the warped image (e.g., line, stripe, etc.) needed at a time to a cache 490 (e.g., a last level cache), and the display driver 240 may read that portion from the cache 490 and cause the display to scan the portion of the warped image. Such aspects advantageously may have reduced bandwidth for the main memory 235, since writing and reading of the warped image to the main memory 235 are eliminated.

In some aspects, the warping of the portion of the image and writing of the portion of the image into the cache 490 is synchronized with the display driver 240. In particular, the display of the wearable display device 120 may be configured to display an image on a display by scanning the display line by line for each refresh of the display. For example, the display may scan the display portion by portion (e.g., line by line or stripe by stripe) for a first image to be displayed, and then refresh the screen by scanning the display portion by portion for a second image to be displayed. Accordingly, the warp engine 480, just before (e.g., a sufficient time before to warp the image) a portion of the display is to be scanned by the display driver 240, may receive updated position information for the wearable display device 120, warp the portion of the image to be scanned on the portion of the display, and write the warped portion of the image to the cache 490. The display driver 240 can then scan the warped portion of the image stored in the cache 490 on the display. Further, in some aspects, while the display driver 240 is scanning the warped portion of the image stored in the cache 490 on the display, the warp engine 480 may further warp a next portion of the image to be scanned on the next portion of the display. Accordingly, the warp engine 480 can generate warped portions of the image to scan just in time for the display driver 240 to scan the warped portions of the image to the display, with minimal M2P delay. Further, in some aspects, the warp engine 480 can get updated position information for each portion of an image scanned to a display at a time, instead of the entire image at a time.

In some aspects, the warp engine 480 may apply lens warping by performing barrel distortion and color aberration on the rendered images using a vector map corresponding to a lens of the wearable display device 120. In some aspects, the warp engine 480 may further apply perspective correction, such as due to time warping, to the vector map.

Figure 5:
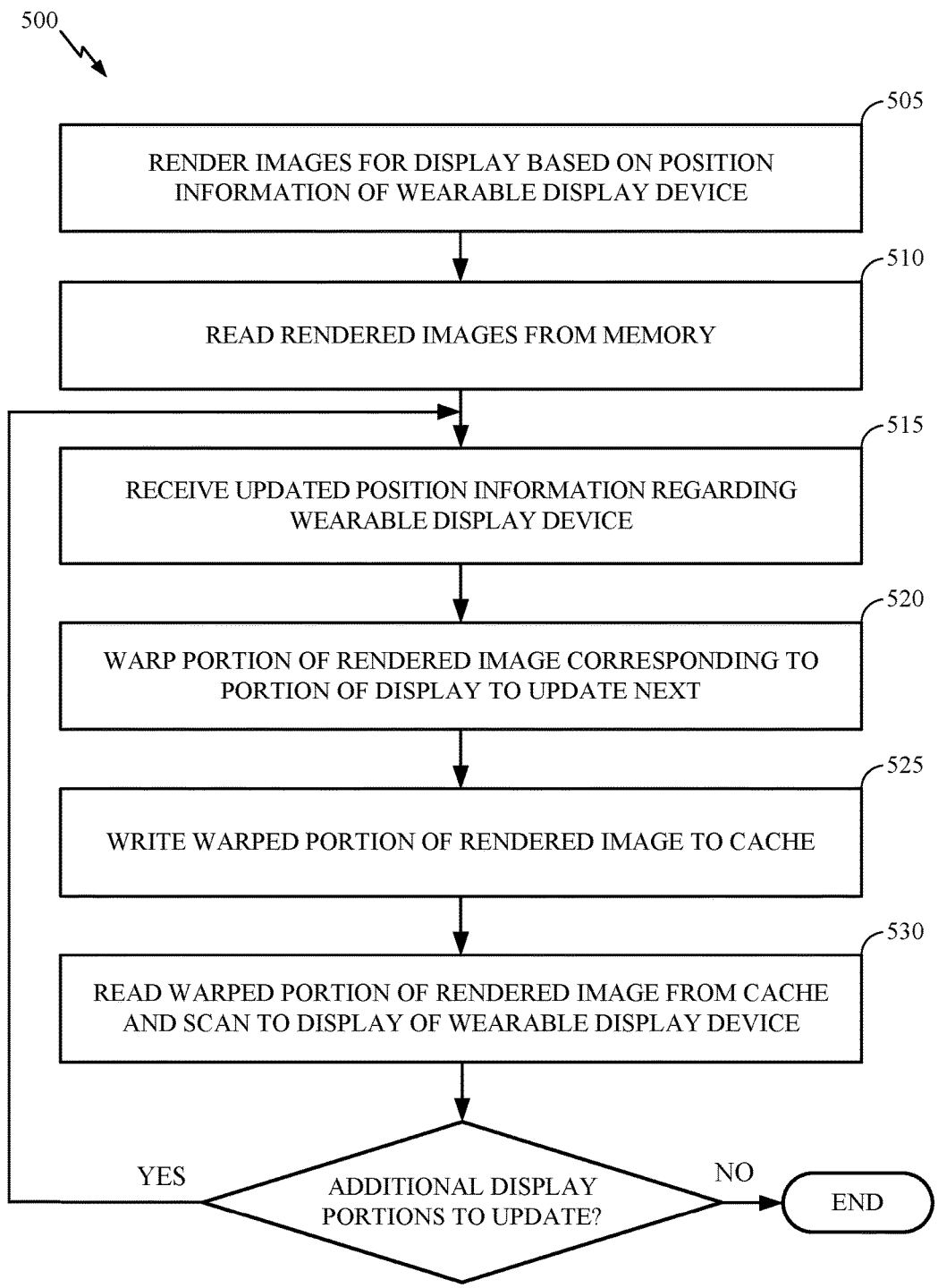
FIG. 5 illustrates example operations for performing just in time warping, in accordance with certain aspects of the present disclosure.

FIG. 5 illustrates example operations 500 for performing just in time warping, such as by computer system 400, in accordance with certain aspects of the present disclosure.

At 505, the GPU 212 renders left and right images for display on wearable display device 120 based on position information of the wearable display device 120 and stores the rendered images in main memory 235. For example, blocks 305-345 of data flow 300 are performed. At 510, the warp engine 480 reads the rendered images from the main memory 235. At 515, the warp engine 480 receives updated position information (e.g., e.g., from a sensor, CPU, etc.) of the wearable display device 120 before a portion of a display of the wearable display device 120 is updated. At 520, the warp engine 480 warps the portion of the rendered images corresponding to the portion of the display to be updated. For example, the warp engine 480 may apply time warping, lens warping, or other types of image warping as discussed herein.

At 525, the warp engine 480 writes the warped portion of the rendered images to the cache 490. At 530, the display driver 240 reads the warped portion of the rendered images from the cache 490 and scans the portion of the rendered images to the display of the wearable display device 120. At 535 (e.g., in parallel with 530), the warp engine 480 determines if there is another portion of the display to be updated. If at 535, it is determined there is another portion of the display to be updated, the process returns to 515 and blocks 515-525 are performed (e.g., in parallel with 530). If at 535, it is determined there is not another portion of the display to be updated, the process ends.

In some aspects, the warp engine 480 may be configured to apply other types of warping beyond lens warping and time warping as discussed herein. For example, in some aspects, the warp engine 480 may be configured to perform other types of warping to rendered images in order to produce better results for VR systems. In some aspects, the GPU 212 may render multiple images corresponding to an image to be displayed on the wearable display device 120 and store the multiple rendered images in main memory 235. The warp engine 480 may be configured to read the multiple rendered images and produce a single output to be scanned to the display of the wearable display device 120 based on the multiple images.

In some aspects, the multiple rendered images may be for the determined position of the wearable display device 120, or for multiple offsets from the determined position of the wearable display device 120. Accordingly, the warp engine 480 may use the multiple rendered images to apply a more accurate time warping by using actual rendered portions of images to warp the image instead of transformation of the image as discussed herein.

Figure 6:
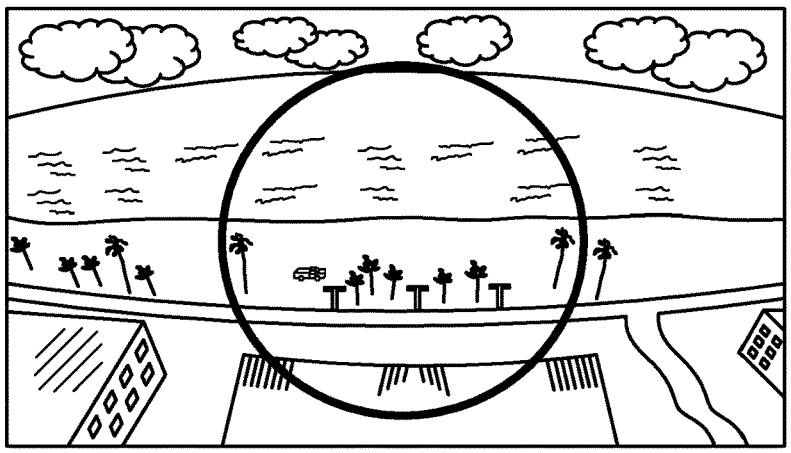
FIG. 6 illustrates an example of different fields of view for an image, in accordance with certain aspects of the present disclosure.
Figure 6:
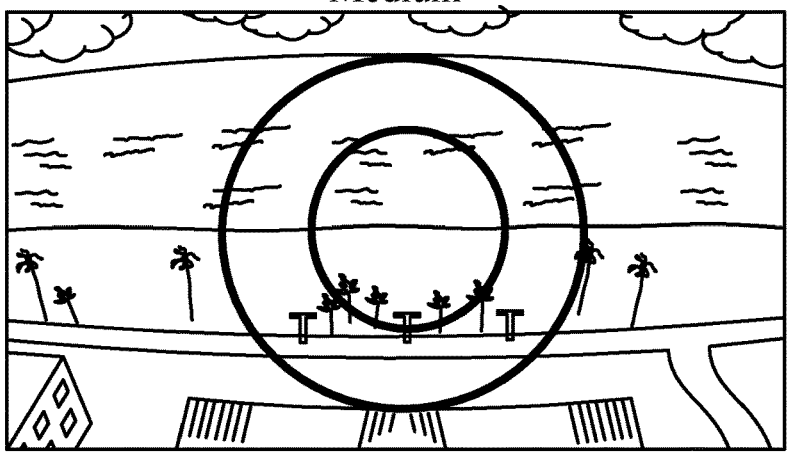
Figure 6:
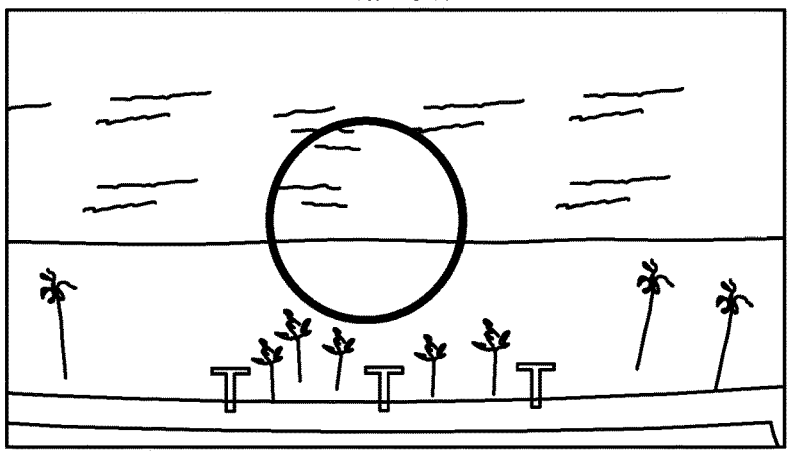

In some aspects, the multiple rendered images may correspond to different perspectives, focus levels, or fields of view of an image. For example, FIG. 6 illustrates different fields of view for an image of a scene including a wide focus of a scene, a medium focus of a scene, and a narrow focus of a scene. Accordingly, the warp engine 480 may support foveated rendering where a different number of pixels/resolution is used to render different portions of an image (e.g., based on the eye position of a user of the wearable display device 120). For example, portions of the image where the eye is focused may be rendered at a higher resolution, while portions of the image where the eye is not focused (e.g., periphery) are rendered at a lower resolution. The GPU 212 may accordingly be configured to render an image at different fields of view as shown in FIG. 6. The warp engine 480, based on sensor input indicating a position of a user's eye, may then utilize different portions of each of the rendered images and different fields of view and generate a single warped image for display on the screen. In some aspects, foveated rendering may be supported by using an alpha-plane map corresponding to the position of the user's eye with respect to the image.

In some aspects, the warp engine 480 may determine and apply the warping described herein separately to each of the different color channels (e.g., red, green, and blue) that make up the rendered images.

In some aspects, the warp engine 480 may warp rendered images, such as change a focus of the rendered images, to adapt them for users with vision impairments (e.g., near-sightedness, far-sightedness, etc.).

Figure 7:
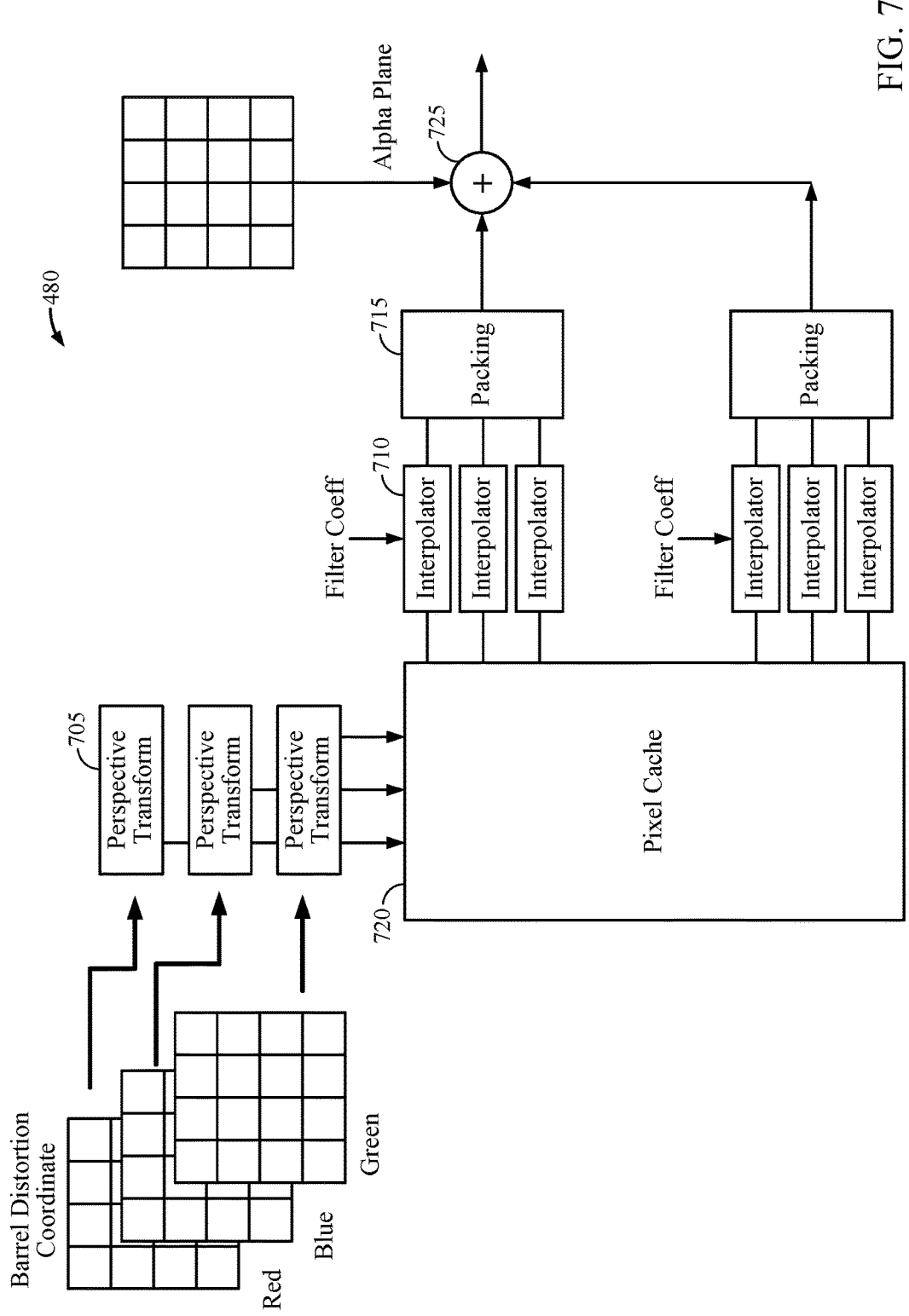
FIG. 7 is a block diagram of an example warp engine of FIG. 4, according to certain aspects of the present disclosure

FIG. 7 is a block diagram of an example warp engine 480, according to certain aspects of the present disclosure. The warp engine 480 includes a cache 720 for storing image data. The image data may be stored as pixels. Further, each pixel may be divided into sub-pixels, each sub-pixel corresponding to a color channel (e.g., red, green, blue).

The warp engine 480 further includes one or more perspective transform units 705. As shown, the warp engine 480 includes three perspective transform units 705, one for each of the color channels. In some aspects, additional or fewer perspective transform units 705 may be included for example for other color channels, or where a single perspective transform unit 705 corresponds to multiple color channels. The perspective transform units 705 are configured to perform the time warping and, optionally, lens warping techniques described herein. For example, as shown, each perspective transform unit 705 receives the pixels of rendered images (e.g., rendered images for different eyes and/or different fields of view) corresponding to a particular color channel and performs the warping on the rendered images. In particular, each perspective transform unit 705 receives updated position information of the wearable display device 120 and a vector map corresponding to the barrel distortion and color aberration to apply to the pixels of rendered images corresponding to a particular color channel. The perspective transform units 705 further apply perspective correction (time warping) to the vector map based on the updated position information of the wearable display device 120 and apply the vector map to the pixels of the rendered images to time warp and lens warp the images. The pixels of the warped images are stored in the cache 720.

The warp engine 480 further includes one or more interpolator units 710. As shown, the warp engine 480 includes three interpolator units 710, one for each of the color channels, per rendered image (e.g., each rendered image corresponding to a different field of view) being warped. In some aspects, warp engine 480 includes additional or fewer interpolator units 710, similar to perspective transform units 705, and further based on whether one or more rendered images are being warped. The interpolator units 710 apply filter coefficients to improve quality of the images.

The warp engine 480 further includes one or more packing units 715. As shown, the warp engine 480 includes a packing unit 715 per rendered image being warped. In some aspects, warp engine 480 includes additional or fewer packing units 715, similar to interpolator units 710. The packing units 715 combine the warped pixels corresponding to different color channels into the overall pixels of the warped image.

The warp engine 480 may further include a combiner 725, for example when the warp engine 480 generates multiple rendered images (e.g., having different fields of view). The combiner 725 may use an alpha-map, as discussed herein, to determine which portions of the multiple rendered images to combine to generate a warped image to be shown on a display.

Figure 8:
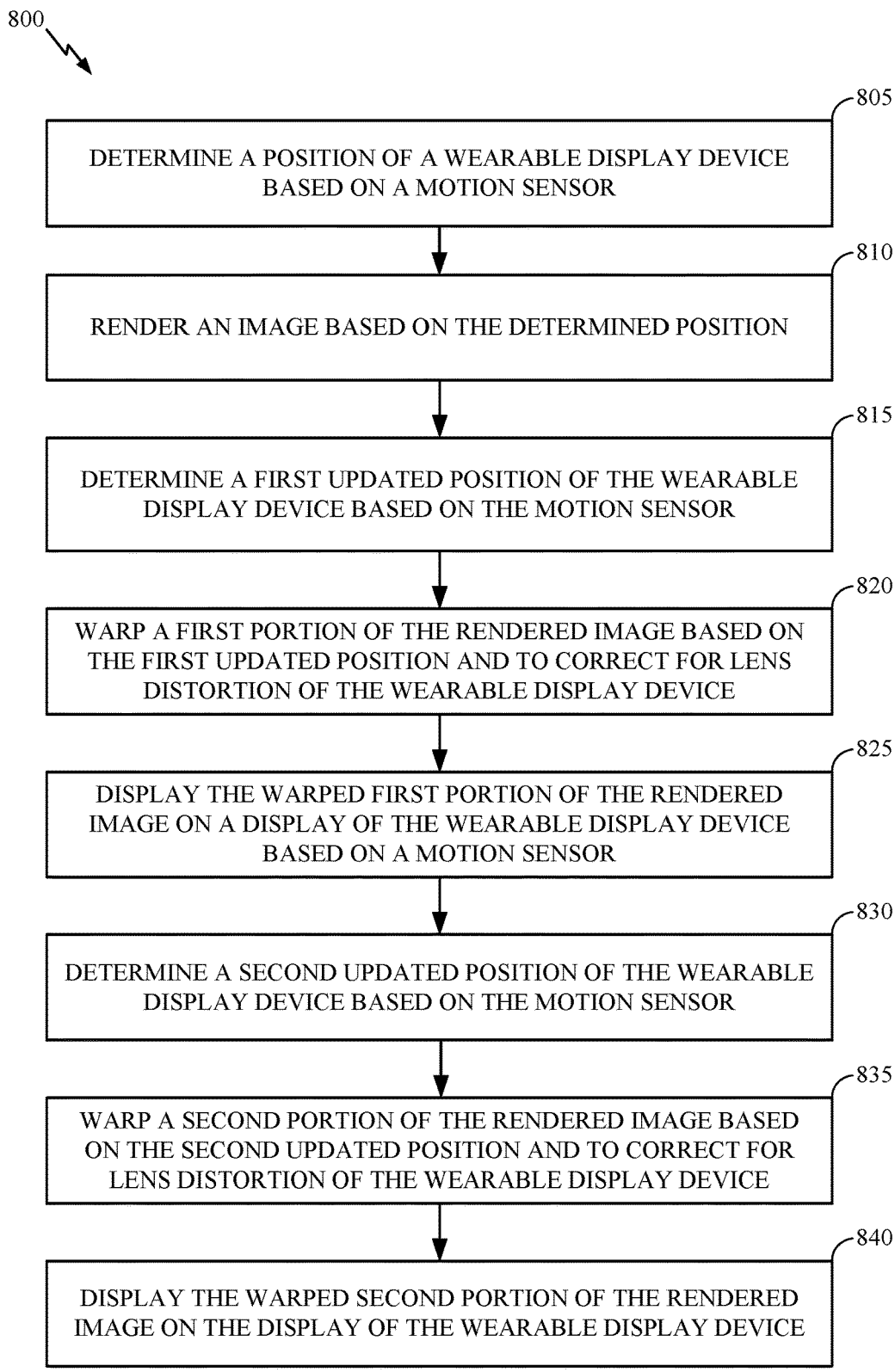
FIG. 8 illustrates example operations of for performing just in time warping, according to certain aspects of the present disclosure.

FIG. 8 illustrates example operations 800 for performing just in time warping, such as by computer system 400, in accordance with certain aspects of the present disclosure.

At 805, the computer system determines a position of the wearable display device based on a motion sensor. At 810, the computer system renders an image based on the determined position. At 815, the computer system determines a first updated position of the wearable display device based on the motion sensor.

At 820, the computer system warps a first portion of the rendered image based on the first updated position and to correct for distortion due to a lens of the wearable display device. At 825, the computer system displays the warped first portion of the rendered image on a display of the wearable display device based on a motion sensor.

At 830, the computer system determines a second updated position of the wearable display device based on the motion sensor. At 835, the computer system warps a second portion of the rendered image based on the second updated position and to correct for distortion due to the lens of the wearable display device. At 840, the computer system displays the warped second portion of the rendered image on the display of the wearable display device.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering. For example, referring to the computer system 400, the CPU 210 may include a position determining component or components to provide the means for determining a position, a first updated position, and a second updated position of the wearable display device 120 based on a motion sensor. The GPU 212 may include an image rendering component or components to provide the means for rendering images based on the determine position. The warp engine 480 may include a portion warping component or components to provide the means for warping a first portion of the rendered image based on the first update position to correction for distortion due to a lens of the wearable display device 120 and for warping a second portion of the rendered image based on the second updated position and to correct for distortion due to the lens of the wearable display device 120. The display driver 240 may include a displaying component or components to provide the means for displaying a first portion of a rendered image and a second portion of a rendered image on a display of the wearable display device 120.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for operating a wearable display device, the method comprising:
   determining a position of the wearable display device based on a motion sensor at a first time;
   rendering an image based on the determined position;
   determining a first updated position of the wearable display device based on the motion sensor at a second time after the first time;
   warping a first portion of the rendered image based on the first updated position and to correct for distortion due to a lens of the wearable display device;
   displaying the warped first portion of the rendered image on a display of the wearable display device;
   determining a second updated position of the wearable display device based on the motion sensor at a third time after the second time;
   warping a second portion of the rendered image based on the second updated position and to correct for distortion due to the lens of the wearable display device; and
   displaying the warped second portion of the rendered image on the display of the wearable display device.

2. The method of claim 1, wherein rendering is performed using a graphics processing unit, and warping is performed using a warp engine separate from the graphics processing unit.

3. The method of claim 1, wherein warping the first portion and warping the second portion are synchronized with refresh of the display of the wearable display device.

4. The method of claim 3, wherein warping the first portion is synchronized with displaying the first portion.

5. The method of claim 3, wherein warping the first portion and warping the second portion are asynchronous with rendering the image.

6. The method of claim 1, further comprising:
   storing the rendered image in a memory;
   reading the rendered image from the memory;
   storing the warped first portion of the rendered image in a cache that is different from the memory; and reading the warped first portion of the rendered image from the cache.

7. The method of claim 6, wherein the cache comprises an on-chip memory.

8. The method of claim 1, further comprising:
rendering a plurality of images, each of the plurality of images corresponding to a different field of view of the image; and
combining portions of each of the plurality of images to generate the warped first portion of the rendered image.

9. The method of claim 1, further comprising warping the first portion of the rendered image to change a focus of the first portion of the rendered image based on a vision of a user of the wearable display device.

10. The method of claim 1, wherein displaying the first warped portion and warping the second portion are performed in parallel.

11. A computer system for operating a wearable display device, the computer system comprising:
a processor configured to:
  determine a position of the wearable display device based on a motion sensor at a first time;
  determine a first updated position of the wearable display device based on the motion sensor at a second time after the first time; and
  determine a second updated position of the wearable display device based on the motion sensor at a third time after the second time;
a graphics processing unit configured to:
  render an image based on the determined position;
a warp engine, separate from the graphics processing unit, configured to:
  warp a first portion of the rendered image based on the first updated position and to correct for distortion due to a lens of the wearable display device; and
  warp a second portion of the rendered image based on the second updated position and to correct for distortion due to the lens of the wearable display device; and
a display driver configured to:
  display the warped first portion of the rendered image on a display of the wearable display device; and
  display the warped second portion of the rendered image on the display of the wearable display device.

12. The computer system of claim 11, wherein warping the first portion and warping the second portion are synchronized with refresh of the display of the wearable display device.

13. The computer system of claim 12, wherein warping the first portion is synchronized with displaying the first portion.

14. The computer system of claim 12, wherein warping the first portion and warping the second portion are asynchronous with rendering the image.

15. The computer system of claim 11, further comprising:
a memory configured to store the rendered image; and
a cache that is different from the memory, the cache being configured to store the warped first portion of the rendered image.

16. The computer system of claim 15, wherein the cache comprises an on-chip memory.

17. The computer system of claim 11, wherein:
the graphics processing unit is further configured to render a plurality of images, each of the plurality of images corresponding to a different field of view of the image; and
the warp engine is further configured to combine portions of each of the plurality of images to generate the warped first portion of the rendered image.

18. The computer system of claim 11, where the warp engine is further configured to warp the first portion of the rendered image to change a focus of the first portion of the rendered image based on a vision of a user of the wearable display device.

19. The computer system of claim 11, wherein displaying the first warped portion and warping the second portion are performed in parallel.

20. A non-transitory, computer readable medium having instructions stored thereon for operating a wearable display device, wherein execution of the instructions by a computing system causes the computing system to carry out the steps of:
determining a position of the wearable display device based on a motion sensor at a first time;
rendering an image based on the determined position;
determining a first updated position of the wearable display device based on the motion sensor at a second time after the first time;
warping a first portion of the rendered image based on the first updated position and to correct for distortion due to a lens of the wearable display device;
displaying the warped first portion of the rendered image on a display of the wearable display device;
determining a second updated position of the wearable display device based on the motion sensor at a third time after the second time;
warping a second portion of the rendered image based on the second updated position and to correct for distortion due to the lens of the wearable display device; and
displaying the warped second portion of the rendered image on the display of the wearable display device.

21. The non-transitory, computer readable medium of claim 20, wherein rendering is performed using a graphics processing unit, and warping is performed using a warp engine separate from the graphics processing unit.

22. The non-transitory, computer readable medium of claim 20, wherein warping the first portion and warping the second portion are synchronized with refresh of the display of the wearable display device.

23. The non-transitory, computer readable medium of claim 22, wherein warping the first portion is synchronized with displaying the first portion.

24. The non-transitory, computer readable medium of claim 22, wherein warping the first portion and warping the second portion are asynchronous with rendering the image.

25. The non-transitory, computer readable medium of claim 20, wherein execution of the instructions by the computing system further causes the computing system to carry out the steps of:
storing the rendered image in a memory;
reading the rendered image from the memory;
storing the warped first portion of the rendered image in a cache that is different from the memory; and
reading the warped first portion of the rendered image from the cache.

26. The non-transitory, computer readable medium of claim 25, wherein the cache comprises an on-chip memory.

27. The non-transitory, computer readable medium of claim 20, wherein execution of the instructions by the computing system further causes the computing system to carry out the steps of:

rendering a plurality of images, each of the plurality of images corresponding to a different field of view of the image; and combining portions of each of the plurality of images to generate the warped first portion of the rendered image.

28. The non-transitory, computer readable medium of claim 20, wherein execution of the instructions by the computing system further causes the computing system to carry out the step of warping the first portion of the rendered image to change a focus of the first portion of the rendered image based on a vision of a user of the wearable display device.

29. The non-transitory, computer readable medium of claim 20, wherein displaying the first warped portion and warping the second portion are performed in parallel.

30. A computer system for operating a wearable display device, the computer system comprising:

means for determining a position of the wearable display device based on a motion sensor at a first time;

means for rendering an image based on the determined position;

means for determining a first updated position of the wearable display device based on the motion sensor at a second time after the first time;

means for warping a first portion of the rendered image based on the first updated position and to correct for distortion due to a lens of the wearable display device;

means for displaying the warped first portion of the rendered image on a display of the wearable display device;

means for determining a second updated position of the wearable display device based on the motion sensor at a third time after the second time;

means for warping a second portion of the rendered image based on the second updated position and to correct for distortion due to the lens of the wearable display device; and means for displaying the warped second portion of the rendered image on the display of the wearable display device.

* * * * *